US009818328B2

United States Patent
Hong et al.

(10) Patent No.: US 9,818,328 B2
(45) Date of Patent: Nov. 14, 2017

(54) DISPLAY DEVICE

(71) Applicant: Samsung Display Co., Ltd., Yongin-si, Gyeonggi-Do (KR)

(72) Inventors: Sung Chul Hong, Asan-si (KR); Yun Hee Kwak, Hwaseong-si (KR); Mi-Sun Lee, Asan-si (KR)

(73) Assignee: Samsung Display Co., Ltd., Samsung-ro, Giheung-Gu, Yongin-si, Gyeonggi-Do (KR)

( * ) Notice: Subject to any disclaimer, the term of this patent is extended or adjusted under 35 U.S.C. 154(b) by 69 days.

(21) Appl. No.: 14/808,251

(22) Filed: Jul. 24, 2015

(65) Prior Publication Data

US 2016/0163279 A1 Jun. 9, 2016

(30) Foreign Application Priority Data

Dec. 9, 2014 (KR) ........................ 10-2014-0175950

(51) Int. Cl.
*G06F 3/038* (2013.01)
*G09G 5/00* (2006.01)
*G09G 3/20* (2006.01)
*G02F 1/1345* (2006.01)
*G09G 3/00* (2006.01)
*G02F 1/1362* (2006.01)

(52) U.S. Cl.
CPC ............. *G09G 3/20* (2013.01); *G02F 1/1345* (2013.01); *G02F 2001/136254* (2013.01); *G09G 3/006* (2013.01); *G09G 2300/08* (2013.01); *G09G 2330/12* (2013.01)

(58) Field of Classification Search
CPC ...... G02F 1/1345; G02F 2001/136254; G09G 2300/08; G09G 2330/12; G09G 3/006; G09G 3/20
See application file for complete search history.

(56) References Cited

U.S. PATENT DOCUMENTS

| 7,956,945 | B2 | 6/2011 | Kim | |
|---|---|---|---|---|
| 2009/0310051 | A1* | 12/2009 | Kim | .................. G02F 1/136204 349/40 |
| 2011/0096449 | A1* | 4/2011 | Lee | ....................... G02F 1/1345 361/91.1 |

FOREIGN PATENT DOCUMENTS

| KR | 10-0656900 B1 | 7/2001 |
|---|---|---|
| KR | 10-1107708 B1 | 8/2006 |
| KR | 10-2008-0099411 A | 11/2008 |
| KR | 10-1033463 B1 | 12/2009 |
| KR | 10-1203756 B1 | 5/2012 |

* cited by examiner

*Primary Examiner* — Insa Sadio
(74) *Attorney, Agent, or Firm* — Robert E. Bushnell, Esq.

(57) ABSTRACT

Provided is a display device including a plurality of pixels; a plurality of data lines connected to the plurality of pixels; a data driver applying data voltages to the plurality of data lines; and a first test pad unit connected to at least one of the plurality of data lines in order to check the data voltages, in which the first test pad unit includes a test pad which is electrically double-separated from the at least one of the data lines.

20 Claims, 5 Drawing Sheets

DISPLAY DEVICE

CLAIM OF PRIORITY

This application makes reference to, incorporates the same herein, and claims all benefits accruing under 35 U.S.C. §119 from an application earlier filed in the Korean Intellectual Property Office on 9 Dec. 2014 and there duly assigned Serial No. 10-2014-0175950.

BACKGROUND OF THE INVENTION

Field of the Invention

Embodiments of the present invention relate to a display device, and more particularly, to a display device capable of measuring an output signal of a driving integrated circuit (IC).

Description of the Related Art

In general, a display device such as a liquid crystal display (LCD) and an organic light emitting diode display includes a plurality of gate lines and a plurality of data lines which are connected with a plurality of pixels. The plurality of pixels is formed at cross points of the gate lines and the data lines. When gate signals of gate-on voltages are sequentially applied to the plurality of gate lines, data voltages are applied to the plurality of data lines in response to the gate signals of the gate-on voltages and thus image data are written in the plurality of pixels.

When the gate signal and the data voltage are not output to normal waveforms, undesired image data are written in the plurality of pixels, and degradation in image quality is generated. Accordingly, in a production process of the display device, it is necessary to check whether the data voltage and the gate signal are output to normal waveforms. Further, even after the production of the display device, in order to find the cause of failure of the display device, it is necessary to check the output of the data voltage and the gate signal.

The above information disclosed in this Background section is only for enhancement of understanding of the background of the invention and therefore it may contain information that does not form the prior art that is already known in this country to a person of ordinary skill in the art.

SUMMARY OF THE INVENTION

The present invention provides a display device having advantages of measuring an output signal of a driving integrated circuit (IC).

An exemplary embodiment of the present invention provides a display device including: a plurality of pixels; a plurality of data lines connected to the plurality of pixels; a data driver applying data voltages to the plurality of data lines; and a first test pad unit connected to at least one of the plurality of data lines in order to check the data voltages, in which the first test pad unit includes a test pad which is electrically double-separated from the at least one of the data lines.

The first test pad unit may include a first wiring connected to the test pad; a stepping member facing the first wiring and separated from the first wiring; a second wiring facing the stepping member and separated from the stepping member and connected to the at least one of the data lines; a first bridge member disposed on the first wiring and the stepping member; and a second bridge member disposed on the stepping member and the second wiring.

The first wiring may include one end connected to the test pad and the other end widely formed for an electrical connection to the first bridge member.

The second wiring may include one end connected to the at least one of the data lines and the other end widely formed for an electrical connection to the second bridge member.

The first test pad unit may further include an insulating layer disposed between the other end of the first wiring and the stepping member, and disposed between the other end of the second wiring and the stepping member.

The insulating layer may be disposed between the first bridge member and the other end of the first wiring, and may be disposed between the first bridge member and the stepping member.

The insulating layer may be disposed between the second bridge member and the other end of the second wiring, and may be disposed between the second bridge member and the stepping member.

At a portion where the other end of the first wiring and the first bridge member overlap with each other, a first through-hole passing through the insulating layer may be formed, and the first wiring and the first bridge member may be electrically connected through the first through-hole.

At a portion where the stepping member and the first bridge member overlap with each other, a second through-hole passing through the insulating layer may be formed, and the stepping member and the first bridge member may be electrically connected through the second through-hole.

At a portion where the stepping member and the second bridge member overlap with each other, a third through-hole passing through the insulating layer may be formed, and the stepping member and the second bridge member may be electrically connected through the third through-hole.

At a portion where the other end of the second wiring and the second bridge member overlap with each other, a fourth through-hole passing through the insulating layer may be formed, and the second wiring and the second bridge member may be electrically connected through the fourth through-hole.

At least one of the test pad, the first wiring, the stepping member, the second wiring, the first bridge member, and the second bridge member may be made of a metal selected from the group consisting of aluminum, silver, copper, molybdenum, chromium, tantalum, and titanium.

A plurality of first test pad units may be provided to be connected to different data lines.

The first test pad unit may be adjacent to an output terminal of the data driver to be connected to the at least one of the plurality of the data lines.

The display device may further include: a gate driver connected to the plurality of pixels through a plurality of gate lines, the gate driver to apply gate signals to the plurality of the gate lines; and a second test pad unit connected to at least one of the plurality of gate lines to check the gate signals, in which the second test pad unit may include a test pad which is electrically double-separated from the at least one of the gate lines.

The second test pad unit may include a first wiring connected to the test pad; a stepping member facing the first wiring and separated from the first wiring; a second wiring facing the stepping member and separated from the stepping member and connected to the at least one of the gate lines; a first bridge member disposed on the first wiring and the stepping member; and a second bridge member disposed on the stepping member and the second wiring.

The first wiring may include one end connected to the test pad and the other end widely formed for an electrical connection to the first bridge member.

The second wiring may include one end connected to the at least one of the gate lines and the other end widely formed for an electrical connection to the second bridge member.

The second test pad unit may further include an insulating layer disposed between the other end of the first wiring and the stepping member, and disposed between the other end of the second wiring and the stepping member.

The second test pad unit may be adjacent to an output terminal of the gate driver to be connected to the at least one of the plurality of the gate lines.

According to the exemplary embodiment of the present invention, it is possible to measure an output signal of a driving IC by the test pad. In addition, it is possible to prevent interference in the output signal of the driving IC from occurring due to a short defect of the test pad caused when static electricity flows.

BRIEF DESCRIPTION OF THE DRAWINGS

A more complete appreciation of the invention, and many of the attendant advantages thereof, will be readily apparent as the same becomes better understood by reference to the following detailed description when considered in conjunction with the accompanying drawings in which like reference symbols indicate the same or similar components, wherein.

DETAILED DESCRIPTION OF THE EMBODIMENTS

Figure 1:
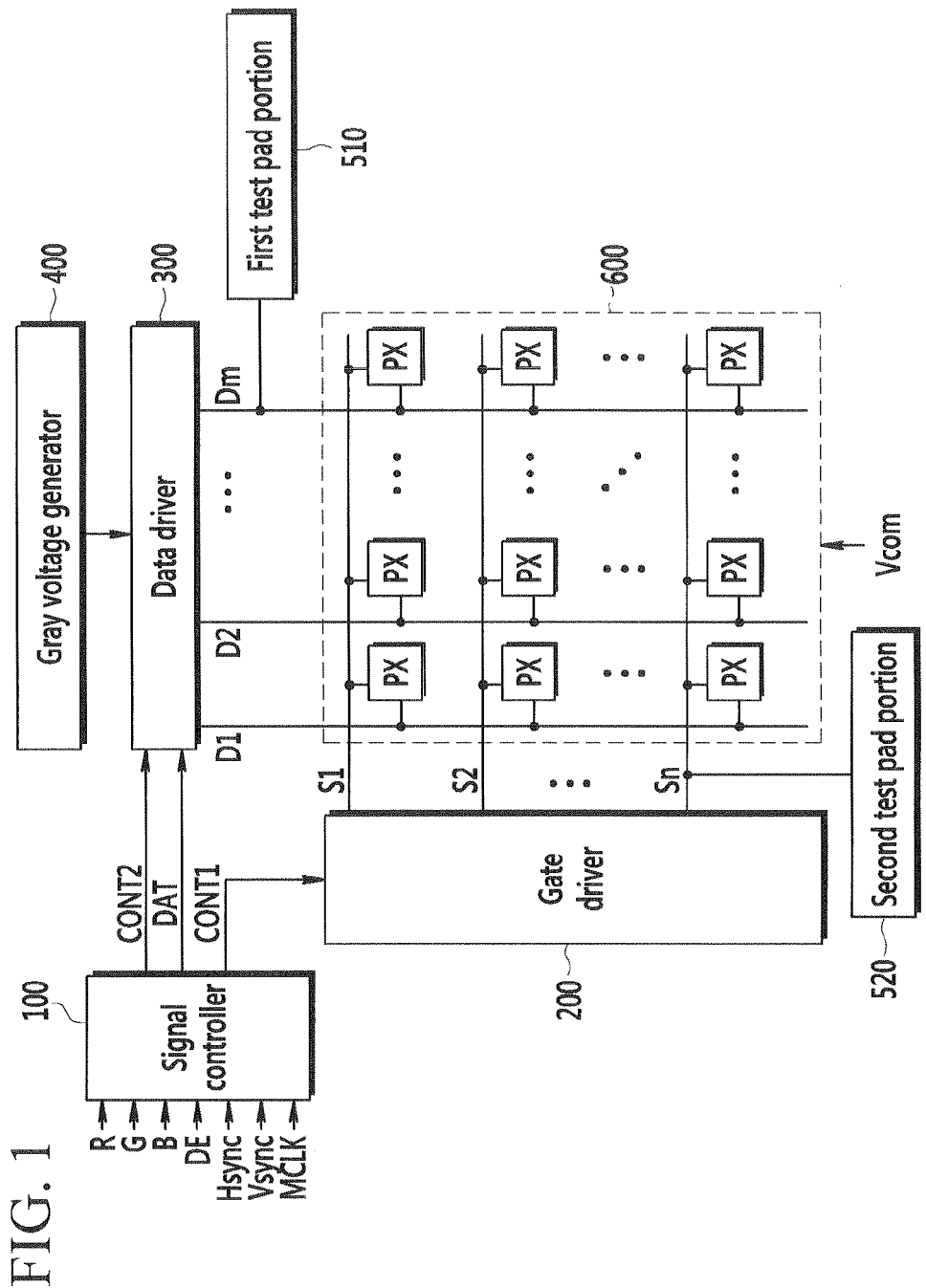
FIG. 1 is a block diagram of a display device according to an exemplary embodiment of the present invention.

The present invention will be described more fully hereinafter with reference to the accompanying drawings, in which exemplary embodiments of the invention are shown. As those skilled in the art would realize, the described embodiments may be modified in various different ways, all without departing from the spirit or scope of the present invention.

Further, in exemplary embodiments, since like reference numerals designate like elements having the same configuration, one exemplary embodiment is representatively described, and in other exemplary embodiments, only a configuration different from one exemplary embodiment will be described.

Accordingly, the drawings and description are to be regarded as illustrative in nature and not restrictive. Like reference numerals designate like elements throughout the specification.

Throughout this specification and the claims that follow, when it is described that an element is "coupled" to another element, the element may be "directly coupled" to the other element or "electrically coupled" to the other element through a third element. In addition, unless explicitly described to the contrary, the word "comprise" and variations such as "comprises" or "comprising", will be understood to imply the inclusion of stated elements but not the exclusion of any other elements.

In the drawings, the thickness of layers, films, panels, regions, etc., are exaggerated for clarity. Like reference numerals designate like elements throughout the specification. It will be understood that when an element such as a layer, film, region, or substrate is referred to as being "on" another element, it can be directly on the other element or intervening elements may also be present. In contrast, when an element is referred to as being "directly on" another element, there are no intervening elements present.

Hereinafter, a display device according to an exemplary embodiment of the present invention will be described in detail with reference to the accompanying drawings.

FIG. 1 is a block diagram of a display device according to an exemplary embodiment of the present invention.

Referring to FIG. 1, the display device includes a signal controller 100, a gate driver 200, a data driver 300, a gray voltage generator 400, a display unit 600, and test pad units 510 and 520.

The display unit 600 includes a plurality of gate lines S1-Sn, a plurality of data lines D1-Dm, and a plurality of pixels PX. The plurality of pixels PX is connected to the plurality of gate lines S1-Sn and the plurality of data lines D1-Dm to be arranged substantially in a matrix (two-dimensional array) form. The plurality of gate lines S1-Sn is extended substantially in a row direction to be substantially parallel to each other. The plurality of data lines D1-Dm is extended substantially in a column direction to be substantially parallel to each other. A voltage Vcom for driving the plurality of pixels PX may be applied to the display unit 600.

The signal controller 100 receives image signals R, G, and B and an input control signal. The image signals R, G, and B store luminance information of the plurality of pixels. The luminance has a predetermined number, for example, 1024 ($=2^{10}$), 256 ($=2^{8}$) or 64 ($=2^{6}$) of grays. The input control signal includes a data enable signal DE, a horizontal synchronization signal Hsync, a vertical synchronization signal Vsync, and a main clock signal MCLK.

The signal controller 100 generates a gate control signal CONT1, a data control signal CONT2, and an image data signal DAT according to the image signal R, G, and B, the data enable signal DE, the horizontal synchronization signal Hsync, the vertical synchronization signal Vsync, and the main clock signal MCLK. The control unit 100 may divide the image signals R, G, and B by a frame unit according to the vertical synchronization signal Vsync and divide the image signals R, G, and B by a gate line unit according to the horizontal synchronization signal Hsync to generate an image data signal DAT.

The signal controller 100 provides the image data signal DAT and the data control signal CONT2 to the data driver 300. The data control signal CONT2 as a signal controlling an operation of the data driver 300 includes a horizontal synchronization start signal STH notifying the transmission start of the image data signal DAT, a load signal LOAD indicating the output of the data signal to the data lines D1-Dm, and a data clock signal HCLK.

The signal controller 100 provides the gate control signal CONT1 to the gate driver 200. The gate control signal CONT1 includes at least one clock signal controlling the output of the scanning start signal STV and the gate-on voltage from the gate driver 200. The gate control signal CONT1 may further include an output enable signal OE limiting the duration of the gate-on voltage.

The gate driver 200 is connected to the plurality of gate lines S1-Sn of the display unit 600. The gate driver 200 applies a gate signal configured in a combination of a gate-on voltage and a gate-off voltage according to the gate control signal CONT1, to the plurality of gate lines S1-Sm.

The data driver 300 is connected to the plurality of data lines D1-Dm of the display unit 600. The data driver 300 selects a gray voltage from the gray voltage generator 400. The data driver 300 applies the selected gray voltage to the data lines D1-Dm as the data voltage. The gray voltage generator 400 may provide only a predetermined number of reference gray voltages without providing voltages for all grays. In this case, the data driver 300 may divide the reference gray voltage to generate gray voltages for all of the grays and select the data voltages among the generated gray voltages.

The gate signals of the gate-on voltages are sequentially applied to the plurality of gate lines S1-Sm by setting one horizontal period as a unit and the data voltages are applied to the plurality of data lines D1-Dm corresponding to the gate signals of the gate-on voltages, and as a result, the data voltages are applied to all the pixels PX to display images in one frame. The one horizontal period is referred to as '1H' and is the same as one period of the horizontal synchronization signal Hsync and the data enable signal DE.

The test pad units 510 and 520 include a first test pad unit 510 connected to any one of the plurality of data lines D1-Dm and a second test pad unit 520 connected to any one of the plurality of gate lines S1-Sn. The first test pad unit 510 is disposed adjacent to an output terminal of the data driver 300 to be connected to one of the data lines D1-Dm. Accordingly, the first test pad unit 510 may check the data voltage output from the data driver 300 without distortion as much as possible. The second test pad unit 520 is disposed adjacent to an output terminal of the gate driver 200 to be connected to any one of the gate lines S1-Sn. Accordingly, the second test pad unit 520 may check the gate signal output from the gate driver 200 without distortion as much as possible. A plurality of first test pad units 510 may be provided to be connected to different data lines D1-Dm. A plurality of second test pad units 520 may be provided to be connected to different gate lines S1-Sn. The first test pad unit 510 may check the data voltage output from the data driver 300. The second test pad unit 520 may check the gate signal output from the gate driver 200.

Each of the signal controller 100, the gate driver 200, the data driver 300, and the gray voltage generator 400 described above may be directly mounted on the display unit 600 in at least one IC chip form. Each of the signal controller 100, the gate driver 200, the data driver 300, and the gray voltage generator 400 may be mounted on a flexible printed circuit film (not illustrated), attached to the display unit 600 in a tape carrier package (TCP) form, or mounted on a separate printed circuit board (not illustrated). Alternatively, the signal controller 100, the gate driver 200, the data driver 300, and the gray voltage generator 400 may be integrated on the display unit 600 together with the signal lines S1-Sn and D1-Dm.

Figure 2:
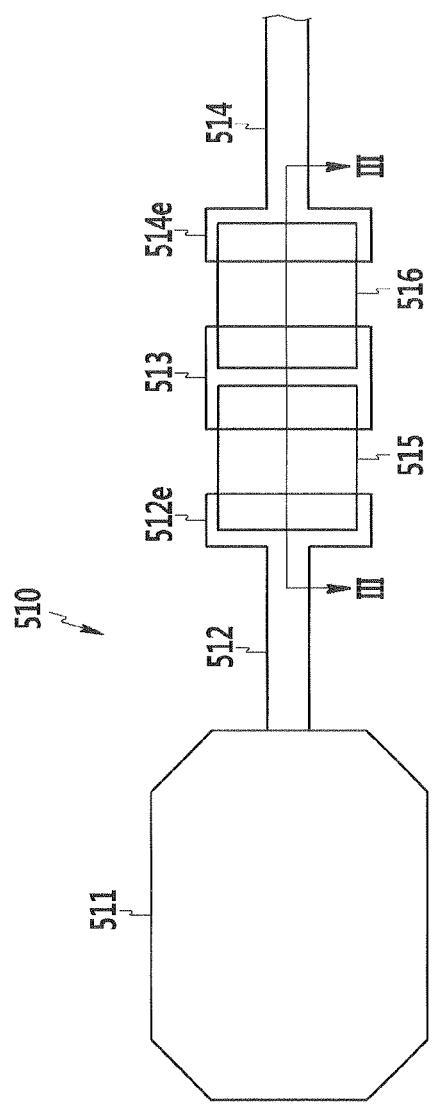
FIG. 2 is a plan view illustrating a test pad unit according to the exemplary embodiment of the present invention.
Figure 3:
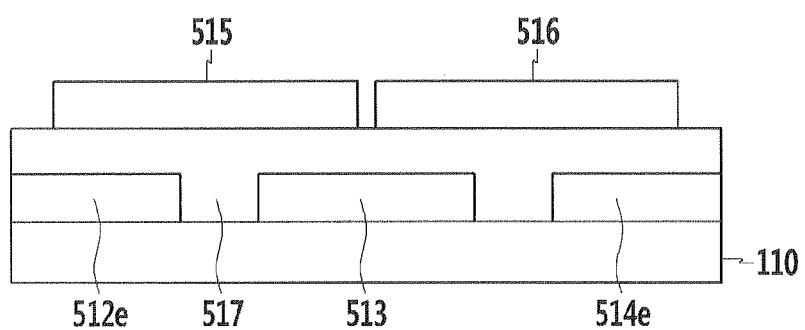
FIG. 3 is a cross-sectional view taken along line III-III of FIG. 2.

FIG. 2 is a plan view illustrating a test pad unit according to the exemplary embodiment of the present invention. FIG. 3 is a cross-sectional view taken along line III-III of FIG. 2. Here, a configuration of the first test pad unit 510 will be described. Since a configuration of the second test pad unit 520 may be the same as that of the first test pad unit 510, the description of the configuration of the second test pad unit 520 is omitted.

Referring to FIGS. 2 and 3, the first test pad unit 510 includes a test pad 511, a first wiring 512 of which one end is connected to the test pad 511, a stepping member 513 facing the first wiring 512 at a distance, a second wiring 514 facing the stepping member 513 at a distance, a first bridge member 515 disposed on the first wiring 512 and the stepping member 513, and a second bridge member 516 disposed on the stepping member 513 and the second wiring 514.

The test pad 511, the first wiring 512, the stepping member 513, and the second wiring 514 are disposed on the insulation substrate 110. The insulation substrate 110 may be made of transparent glass or plastic. At least one of the test pad 511, the first wiring 512, the stepping member 513, and the second wiring 514 may be made of aluminum (Al) or aluminum-based metal such as an aluminum alloy, silver (Ag) or silver-based metal such as a silver alloy, copper (Cu) or copper-based metal such as a copper alloy, molybdenum (Mo) or molybdenum-based metal such as a molybdenum alloy, chromium (Cr), tantalum (Ta), and titanium (Ti). Alternatively, at least one of the test pad 511, the first wiring 512, the stepping member 513, and the second wiring 514 may have a multilayer structure including at least two conductive layers having different physical properties. The test pad 511, the first wiring 512, the stepping member 513, and the second wiring 514 may be simultaneously formed with the same material. The stepping member 513 is electrically separated from the first wiring 512 and the second wiring 514.

The first wiring 512 includes one end connected to the test pad 511 and the other end 512e which is widely formed for electrical connection. The other end 512e of the first wiring 512 faces the stepping member 513.

The second wiring 514 includes one end connected to the data lines D1-Dm and the other end 514e which is widely formed for electrical connection. In the case of the second test pad unit 520, one end of the second wiring 514 is connected to the gate lines S1-Sn. The other end 514e of the second wiring 514 faces the stepping member 513.

On the other end 512e of the first wiring 512, the stepping member 513, and the other end 514e of the second wiring 514, an insulating layer 517 is disposed. The insulating layer 517 may be made of silicon nitride (SiNx), silicon oxide (SiOx), or the like. The insulating layer 517 may have a multilayer structure including at least two insulating layers having different physical properties.

A first bridge member 515 and a second bridge member 516 are disposed on the insulating layer 517. The first bridge member 515 is disposed to overlap the other end 512e of the first wiring 512 and the stepping member 513. The second bridge member 516 is disposed to overlap the stepping member 513 and the other end 514e of the second wiring 514. The first bridge member 515 and the second bridge member 516 are spaced apart from each other to be electrically separated from each other. At least one of the first bridge member 515 and the second bridge member 516 may be made of aluminum (Al) or aluminum-based metal such as an aluminum alloy, silver (Ag) or silver-based metal such as a silver alloy, copper (Cu) or copper-based metal such as a copper alloy, molybdenum (Mo) or molybdenum-based metal such as a molybdenum alloy, chromium (Cr), tantalum (Ta), and titanium (Ti). Alternatively, at least one of the first bridge member 515 and the second bridge member 516 may also have a multilayer structure including at least two conductive layers having different physical properties. The first bridge member 515 and the second bridge member 516 may be simultaneously formed with the same material.

As such, when the data voltage applied to the data lines D1-Dm is measured by using the first test pad unit 510, the other end 512e of the first wiring 512 and the first bridge member 515 are electrically connected to each other, the first bridge member 515 and the stepping member 513 are electrically connected to each other, the stepping member 513 and the second bridge member 516 are electrically connected to each other, and the second bridge member 516 and the other end 514e of the second wiring 514 are electrically connected to each other, and thereafter, the data voltage may be measured by the test pad 511. When a through-hole passing through the first bridge member 515 and the insulating layer 517 and a through-hole passing through the second bridge member 516 and the insulating layer 517 are formed by using a laser and the like, the first bridge member 515 and the second bridge member 516 are fused to be physically connected to the other end 512e of the first wiring, the stepping member 513, and the other end 514e of the second wiring which are positioned therebelow, through the through-hole, and thus the electrical connection may be performed.

Generally, the output of the data voltage and the gate signal for all the display devices is not checked. Accordingly, in the display device, the first test pad unit 510 and the second test pad unit 520 are produced by the structure illustrated in FIGS. 2 and 3.

As described above, the first test pad unit 510 includes a test pad 511 which is electrically double-separated from the data lines D1-Dm by the stepping member 513, the first bridge member 515, and the second bridge member 516. In other words, there are at least two electrically insulating portions between the test pad 511 and the data lines D1-Dm. Accordingly, even though a short defect between the first bridge member 515 and the first wiring 512 or a short defect between the second bridge member 516 and the second wiring 514 is caused when static electricity flows, the test pad 511 and the data lines D1-Dm may be maintained to be electrically separated from each other. Therefore, a defect in which interference occurs in the output signal of the data driver 300 due to the short defect of the first test pad unit 510 may be reduced. Similarly, a defect in which interference occurs in the output signal of the data driver 200 due to the short defect of the second test pad unit 520 may be reduced.

Hereinafter, a configuration of electrically connecting the first test pad unit 510 will be described with reference to FIGS. 4 and 5.

Figure 4:
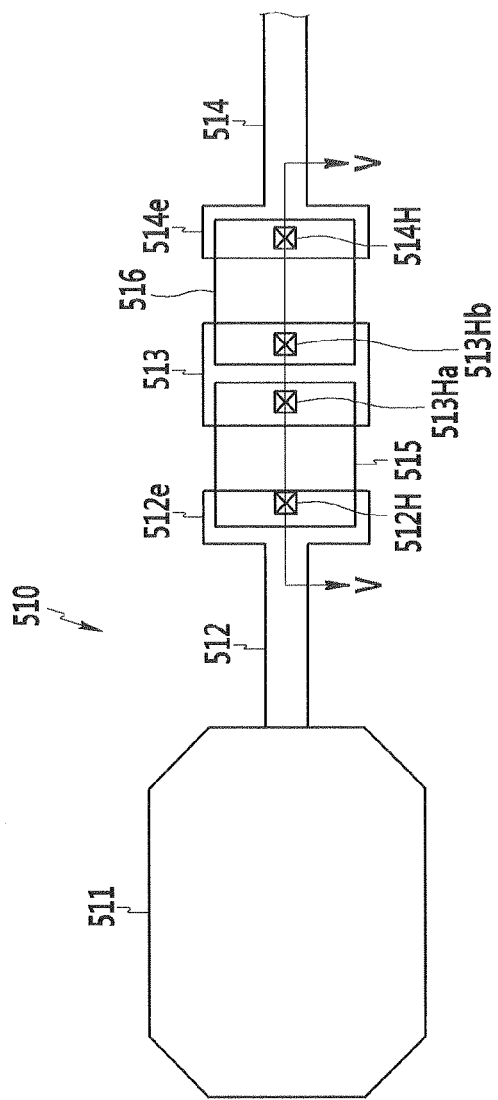
FIG. 4 is a plan view illustrating the test pad unit that is physically and electrically connected to each other according to the exemplary embodiment of the present invention.

FIG. 4 is a plan view illustrating the test pad unit that is physically and electrically connected to each other according to the exemplary embodiment of the present invention. FIG. 5 is a cross-sectional view taken along line V-V of FIG. 4.

Figure 5:
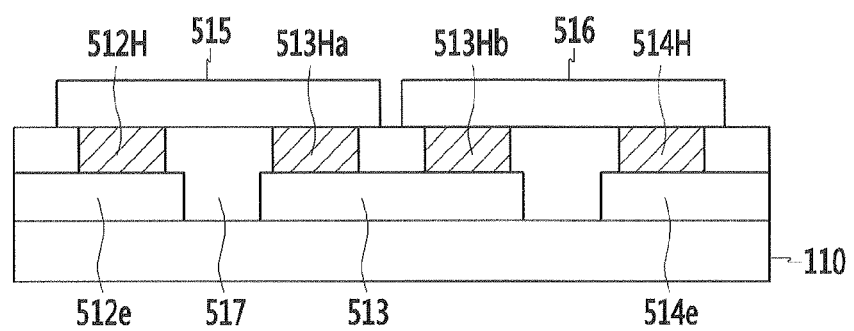
FIG. 5 is a cross-sectional view taken along line V-V of FIG. 4.

Referring to FIGS. 4 and 5, at a portion where the other end 512e of the first wiring 512 and the first bridge member 515 overlap with each other, a first through-hole 512H passing through the insulating layer 517 is formed by using a laser and the like. While the first through-hole 512H is formed, a part of the first bridge member 515 is fused to fill the first through-hole 512H, and the first wiring 512 and the first bridge member 515 are physically and electrically connected to each other through the first through-hole 512H.

At a portion where the stepping member 513 and the first bridge member 515 overlap with each other, a second through-hole 513Ha passing through the insulating layer 517 is formed. While the second through-hole 513Ha is formed, a part of the first bridge member 515 is fused to fill the second through-hole 513Ha, and the stepping member 513 and the first bridge member 515 are physically and electrically connected to each other through the second through-hole 513Ha.

At a portion where the stepping member 513 and the second bridge member 516 overlap with each other, a third through-hole 513Hb passing through the insulating layer 517 is formed. While the third through-hole 513Hb is formed, a part of the second bridge member 516 is fused to fill the third through-hole 513Hb, and the stepping member 513 and the second bridge member 516 are physically and electrically connected to each other through the third through-hole 513Hb.

At a portion where the other end 514e of the second wiring 514 and the second bridge member 516 overlap with each other, a fourth through-hole 514H passing through the insulating layer 517 is formed. While the fourth through-hole 514H is formed, a part of the second bridge member 516 is fused to fill the fourth through-hole 514H, and the second wiring 514 and the second bridge member 516 are physically and electrically connected to each other through the fourth through-hole 514H.

Accordingly, the test pad 511 is electrically connected to the data lines D1-Dm through the first wiring 512, the first bridge member 515, the stepping member 513, the second bridge member 516, and the second wiring 514. By the same method, the test pad of the second test pad unit 520 may also be electrically connected to the gate lines S1-Sn.

Meanwhile, after the outputs of the data voltage and the gate signal are checked by the first test pad unit 510 and the second test pad unit 520, the first wiring 512 and the second wiring 514 are disconnected from each other to prevent the interference in the data voltage and the gate signal from occurring.

While this invention has been described in connection with what is presently considered to be practical exemplary embodiments, it is to be understood that the invention is not limited to the disclosed embodiments, but, on the contrary, is intended to cover various modifications and equivalent arrangements included within the spirit and scope of the appended claims.

What is claimed is:
1. A display device, comprising:
a plurality of pixels;
a plurality of data lines connected to the plurality of pixels;
a data driver applying data voltages to the plurality of the data lines; and
a first test pad unit connected to at least one of the plurality of the data lines in order to check the data voltages, the first test pad unit including a test pad which is electrically double-separated from the at least one of the data lines, the first test pad unit further comprising:
a first wiring connected to the test pad;
a stepping member facing the first wiring and separated from the first wiring, the stepping member disposed on the same layer as the first wiring; and
a second wiring facing the stepping member and separated from the stepping member, the second wiring disposed on the same layer as the stepping member, the second wiring connected to the at least one of the data lines.

2. The display device of claim 1, wherein the first test pad unit comprises:
a first bridge member disposed on the first wiring and the stepping member; and a second bridge member disposed on the stepping member and the second wiring.

3. The display device of claim 2, wherein the first wiring includes one end connected to the test pad and the other end widely formed for an electrical connection to first bridge member.

4. The display device of claim 3, wherein the second wiring includes one end connected to the at least one of the data lines and the other end widely formed for electrical connection to the second bridge member.

5. The display device of claim 4, wherein the first test pad unit further comprises:
an insulating layer disposed between the other end of the first wiring and the stepping member, and disposed between the other end of the second wiring and the stepping member.

6. The display device of claim 5, wherein the insulating layer is disposed between the first bridge member and the other end of the first wiring, and is disposed between the first bridge member and the stepping member.

7. The display device of claim 6, wherein the insulating layer is disposed between the second bridge member and the other end of the second wiring, and is disposed between the second bridge member and the stepping member.

8. The display device of claim 7, wherein at a portion where the other end of the first wiring and the first bridge member overlap with each other, a first through-hole passing through the insulating layer is formed, and the first wiring and the first bridge member are electrically connected through the first through-hole.

9. The display device of claim 8, wherein at a portion where the stepping member and the first bridge member overlap with each other, a second through-hole passing through the insulating layer is formed, and the stepping member and the first bridge member are electrically connected through the second through-hole.

10. The display device of claim 9, wherein at a portion where the stepping member and the second bridge member overlap with each other, a third through-hole passing through the insulating layer is formed, and the stepping member and the second bridge member are electrically connected through the third through-hole.

11. The display device of claim 10, wherein at a portion where the other end of the second wiring and the second bridge member overlap with each other, a fourth through-hole passing through the insulating layer is formed, and the second wiring and the second bridge member are electrically connected through the fourth through-hole.

12. The display device of claim 2, wherein at least one of the test pad, the first wiring, the stepping member, the second wiring, the first bridge member, and the second bridge member is made of a metal selected from the group consisting of aluminum, silver, copper, molybdenum, chromium, tantalum, and titanium.

13. The display device of claim 1, wherein a plurality of first test pad units is provided to be connected to different data lines.

14. The display device of claim 1, wherein the first test pad unit is disposed adjacent to an output terminal of the data driver to be connected to the at least one of the plurality of the data lines.

15. The display device of claim 1, further comprising:
a gate driver connected to the plurality of pixels through a plurality of gate lines, the gate driver applying gate signals to the plurality of the gate lines; and
a second test pad unit connected to at least one of the plurality of the gate lines to check the gate signals, the second test pad unit including a test pad which is electrically double-separated from the at least one of the gate lines.

16. The display device of claim 15, wherein the second test pad unit comprises:
a first wiring connected to the test pad;
a stepping member facing the first wiring and separated from the first wiring;
a second wiring facing the stepping member and separated from the stepping member, the second wiring connected to the at least one of the gate lines;
a first bridge member disposed on the first wiring and the stepping member; and
a second bridge member disposed on the stepping member and the second wiring.

17. The display device of claim 16, wherein the first wiring includes one end connected to the test pad and the other end widely formed for electrical connection to the first bridge member.

18. The display device of claim 17, wherein the second wiring includes one end connected to the at least one of the gate lines and the other end widely formed for electrical connection to the second bridge.

19. The display device of claim 18, wherein the second test pad unit further comprises:
an insulating layer disposed between the other end of the first wiring and the stepping member, and disposed between the other end of the second wiring and the stepping member.

20. The display device of claim 15, wherein the second test pad unit is disposed adjacent to an output terminal of the gate driver to be connected to the at least one of the plurality of the gate lines.

* * * * *